US006670951B2

(12) United States Patent
Clough et al.

(10) Patent No.: US 6,670,951 B2
(45) Date of Patent: Dec. 30, 2003

(54) METHODS AND SYSTEMS FOR INCREASING THE INPUT EFFICIENCY OF PERSONAL DIGITAL ASSISTANTS AND OTHER HANDHELD STYLUS-ENGAGABLE COMPUTING DEVICES

(75) Inventors: James Clough, Meridian, ID (US); Darrel Cherry, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 267 days.

(21) Appl. No.: 09/898,727

(22) Filed: Jul. 3, 2001

(65) Prior Publication Data

US 2003/0006974 A1 Jan. 9, 2003

(51) Int. Cl.$^7$ .................................................. G09G 5/00
(52) U.S. Cl. ....................................... 345/173; 345/179
(58) Field of Search ........................ 345/169, 173–183; 178/19.01–19.05

(56) References Cited

U.S. PATENT DOCUMENTS

| 5,596,656 | A | * | 1/1997 | Goldberg | 382/186 |
| 5,764,224 | A | * | 6/1998 | Lilja et al. | 345/179 |
| 5,973,677 | A | * | 10/1999 | Gibbons | 345/179 |
| 6,094,197 | A | * | 7/2000 | Buxton et al. | 345/863 |
| 6,262,684 | B1 | * | 7/2001 | Stewart et al. | 343/702 |

* cited by examiner

*Primary Examiner*—Regina Liang

(57) ABSTRACT

Methods and systems for enhancing the input fidelity of personal digital assistants (PDAs), and other handheld stylus-engagable computing devices are described. In some embodiments, this can be done by associating input commands with different user-input activities, including different combinations of user-input activities. By using different combinations of user-input activities to designate particular input commands, a more robust collection of commands can be provided to a user in a manner that is simple, straightforward and easy to understand.

21 Claims, 8 Drawing Sheets

USER-INPUT ACTIVITIES

| COMMANDS | 1 | 2 | 3 | 4 |
|---|---|---|---|---|
| Command 1 | X | | | X |
| Command 2 | | X | | X |
| Command 3 | | | X | X |
| Command 4 | X | | | X |
| Command 5 | | X | | X |

*Fig. 2*

300 — Associate one or more input commands with a combination of user-input activities 302 — Detect a combination of user-input activities 304 — Generate an input command associated with the detected combination 306 — Perform a generated command

*Fig. 3*

METHODS AND SYSTEMS FOR INCREASING THE INPUT EFFICIENCY OF PERSONAL DIGITAL ASSISTANTS AND OTHER HANDHELD STYLUS-ENGAGABLE COMPUTING DEVICES

TECHNICAL FIELD

This invention relates to methods and systems for increasing the input efficiency of personal digital assistants and other handheld stylus-engagable computing devices.

BACKGROUND

With the increased mobility of people in today's workforce, the demand for mobile computing and communication capabilities outside of the office has also increased. Those inside the office, as well as those who typically work outside the office such as salespeople and field professionals, often require the ability to communicate with others and access various data files. In response to this demand, handheld computing devices such as personal digital assistants (PDAs) have been developed.

A PDA is a compact device that can serve various functions including a cellular phone, facsimile transmitter, personal organizer, and the like. PDAs typically include a stylus and a touch screen for user input, and may include a keyboard. PDAs can be used for such things as sending and retrieving e-mail, Web browsing, and data-sharing applications over the Internet, intranet or corporate networks.

FIG. 1 shows an exemplary PDA 100 including a stylus 102. PDA 100 includes a housing 104 that defines a display area 106 that supports a touch screen 108. Various user-engagable buttons 110 are provided and enable a user to interact with the PDA. To interact with the PDA, the user can either use buttons 110 to make various menu selections that are displayed on the touch screen 108, or they can use stylus 102 to physically engage the touch screen.

Because of the compact nature of PDAs, there are some fundamental issues that have evolved with respect to their input efficiency. Specifically, the input fidelity in PDAs is typically very low. There is a stylus that will allow a user to touch on various places on the screen. There typically is not a keyboard per se, so if a user wishes to enter a large volume of information rapidly, they really don't have that capability.

There have been attempts in the past directed to solving the input fidelity issues regarding PDAs.

One such attempt provides character recognition technology whereby a user can write on the touch screen using the stylus, or have a small keyboard pop up on the display that can then be used to touch-select letters. This attempt can be slow and cumbersome. For example, due to the small screen real estate area, it is often inconvenient and difficult to write large amounts of information on the touch screen. In addition, the small screen real estate can adversely affect the visual resolution of the displayed keyboard, thus making input activities more difficult.

Another attempt to solve the input fidelity issues regarding PDAs places a large number of buttons on the PDA and/or screen for the user to engage. This attempt is limited by the form factor or size of the PDA. Consider again FIG. 1. There simply is not a great deal of space available to accommodate a large number of additional buttons.

Yet another attempt to solve the input fidelity issues regarding PDAs provides a "drill down" functionality that allows a user to drill down to various lower level menus which, in turn, display additional and different menu options. One way of doing this is to have the stylus physically engage the screen for a predetermined time period (e.g. 3 seconds), whereupon a second menu can pop up and be displayed. This attempt requires extra time and effort on the user's part to drill down through the various menus. In addition, this attempt can be confusing to use and can result in the user following unintended menu branches. This drill down problem is similar to the drill down problem that exists in cells phones having drill down capabilities. Anyone who has ever attempted to use the drill down capabilities in a cell phone has probably experienced at least one unintended frolic through menu selections that they were not looking for.

Accordingly, this invention arose out of concerns associated with improving the input fidelity of personal digital assistants (PDAs) and other handheld computing devices.

SUMMARY

Methods and systems for enhancing the input fidelity of personal digital assistants (PDAs), and other hand-held, stylus-engagable computing devices are described. In some embodiments, this can be done by associating input commands with different user-input activities, including different combinations of user-input activities. By using different combinations of user-input activities to designate particular input commands, a more robust collection of commands can be provided to a user in a manner that is simple, straightforward and easy to understand.

In some embodiments, methods and systems are provided that associate one or more input commands for use with a stylus-engagable, hand-held computing device, with a combination of user-input activities. The computing device comprises a touch screen that is engagable with a stylus. A combination of user-input activities is detected and an input command is generated that is associated with the detected combination of user-input activities. In some embodiments, one type of user-input activity comprises transmitting a signal from the stylus to the hand-held computing device. The generated command is then performed.

In other embodiments, methods and systems are provided that display a selectable area on a touch screen of a hand-held computing device. The selectable area is touch-selectable by a stylus that is associated with the hand-held computing device. A first command is executed if a stylus engages the selectable area. A second different command is executed if the stylus engages the selectable area and the stylus transmits a receivable signal to the personal digital assistant.

BRIEF DESCRIPTION OF THE DRAWINGS

The same numbers are used throughout the drawings to reference like features and components.

FIG. 2 is a table that illustrates certain inventive concepts in accordance with one or more embodiments.

FIG. 3 is a flow diagram that describes steps in a method in accordance with one embodiment.

DETAILED DESCRIPTION

Overview

Figure 1:
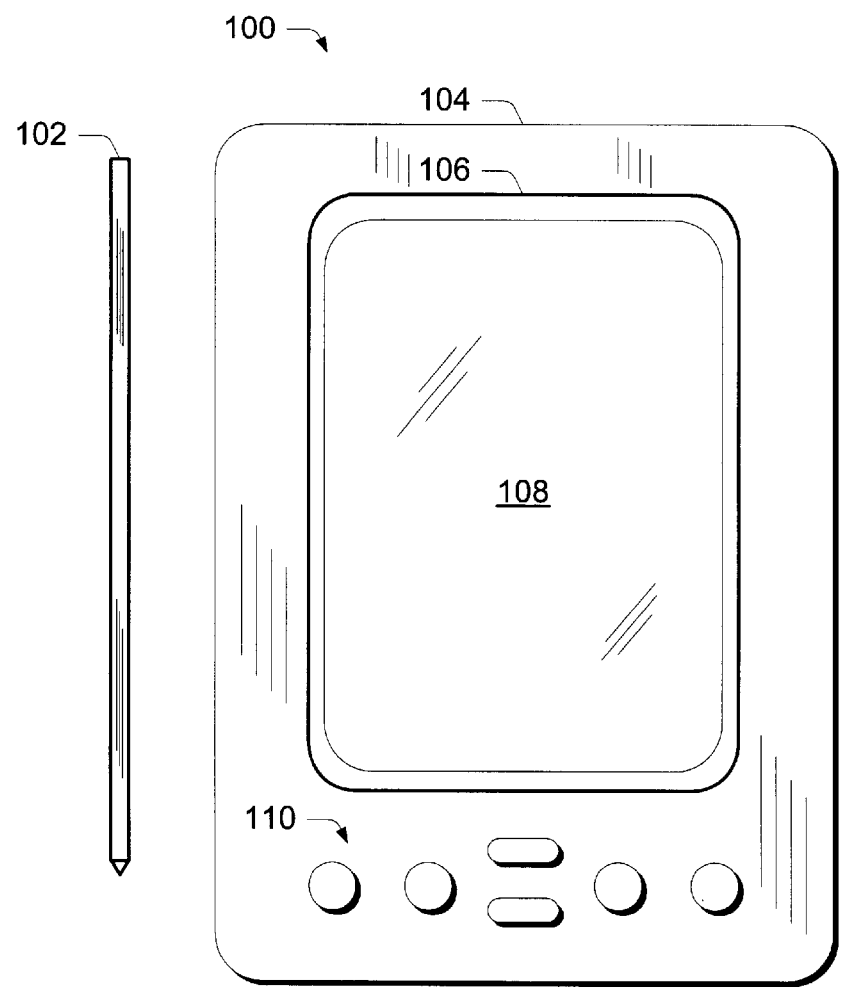
FIG. 1 is an illustration of a personal digital assistant.

The embodiments described below can greatly enhance the input fidelity of personal digital assistants (PDAs) and other handheld stylus-engagable computing devices. In some embodiments, this can be done by associating input commands with different user-input activities, including different combinations of user-input activities. By using different combinations of user-input activities to designate particular input commands, a more robust collection of commands can be provided to a user in a manner that is simple, straight-forward and easy to understand.

Examples of user-input activities can include engaging a user-engagable structure on the PDA, pressing a button on the PDA, touching the touch screen of the PDA with a stylus and the like. So, for example, one input command might be given by both engaging a particular button on the PDA and touching a displayed item on the touch screen with the stylus. Yet, a different input command might be given by only engaging the same button.

Exemplary Inventive Principles

To assist the reader in understanding and appreciating the inventive embodiments described below, the following discussion provides an explanation of various inventive principles that are embodied in at least some of the embodiments.

FIG. 2 shows a table 200 that organizes and associates various input commands 202 with various user-input activities. An "X" in a particular box for an associated command means that that particular user-input activity is used to generate that input command. The commands in the example are numbered "1" through "5", while there are four exemplary user-input activities. It is to be appreciated and understood that many more commands are typically organized and associated with various user-input activities.

As noted above, user-input activities can comprise different types of activities. For purposes of this example, assume the following. User activity 1 consists of a user engaging a first button associated with the PDA; user activity 2 consists of a user engaging a second button associated with the PDA; user activity 3 consists of a user engaging a third button associated with the PDA; and user activity 4 consists of a user engaging a certain area of the PDA's touch screen with the stylus. The engagable areas on the touch screen can be different from one another.

From table 200, the following can be ascertained. When a user engages the first button and touches a particular area of the PDA's touch screen with the stylus, command 1 is generated. A different command is generated if, instead of engaging the first button and touching the particular area of the PDA's touch screen, the user simply only touches the same area of the touch screen without engaging the first button. Similarly, when a user engages the second button and touches a particular area of the PDA's touch screen with the stylus, command 2 is generated. The "particular area" that is touched by the stylus can be the same area or a different area from the above example. A different command is generated if, instead of engaging the second button and touching the particular area of the PDA's touch screen, the user simply only touches the same area of the touch screen without engaging the second button. Likewise, when a user engages the third button and touches a particular area of the PDA's touch screen with the stylus, command 3 is generated. A different command is generated if, instead of engaging the third button and touching the particular area of the PDA's touch screen, the user simply only touches the same area of the touch screen without engaging the third button. Explanation of commands 4 and 5 logically follow from the above discussion.

FIG. 3 is a flow diagram that describes steps in a method in accordance with one embodiment. The steps can be implemented in any suitable hardware, software, firmware, or combination thereof. In the illustrated example, the steps can be performed by a suitably programmed PDA. The various steps can reside as software instructions that are embodied on a readable-medium that comprises part of the PDA.

Step 300 associates one or more input commands with a combination of user-input activities. But one example of how this can be done is given above in connection with FIG. 2. Specifically, user-input activities such as engaging a particular button and touching a particular area of the PDA's touch screen are associated with different commands. Step 302 detects a combination of user-input activities. This step is implemented by the PDA detecting when a user has performed a combination of user-input activities. For example, if a user were to depress a first button and engage a particular area of the PDA's touch screen, then this step would detect that event. Specific examples of how this can be done in various embodiments are given below.

Step 304 generates an input command associated with the detected combination, and step 306 performs a generated command.

Figure 4:
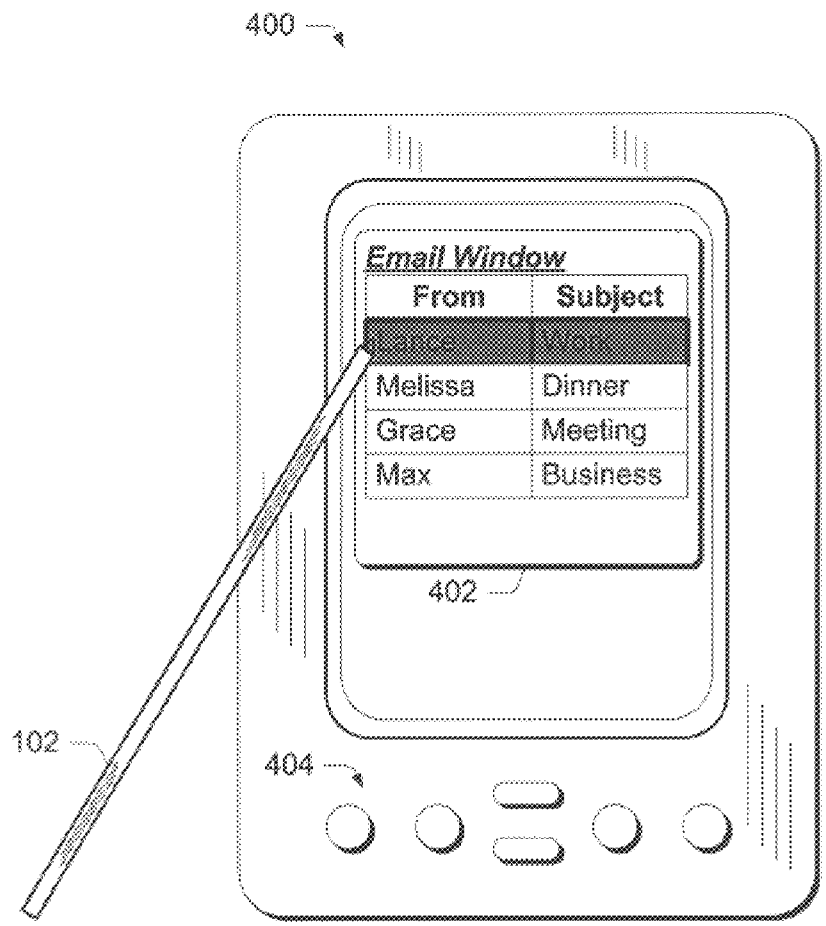
FIG. 4 is an illustration of a personal digital assistant in accordance with one embodiment.
Figure 5:
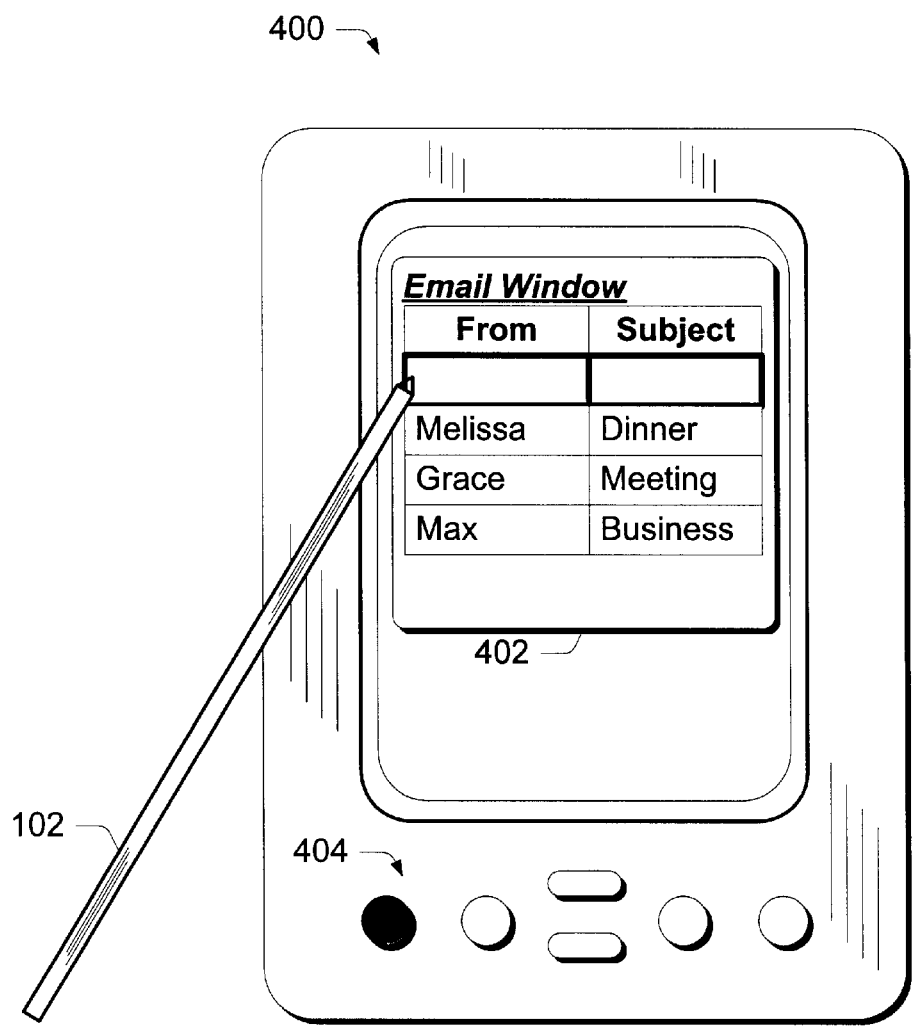
FIG. 5 is an illustration of a personal digital assistant in accordance with one embodiment.

As an example, consider the following in connection with FIGS. 4 and 5. FIG. 4 shows a PDA 400 in which the user has called up an email window 402. The PDA includes multiple buttons generally designated at 404. The email window 402 contains four email messages—one from Lance, Melissa, Grace, and Max. The user has selected, by touching the touch screen with stylus 102, the email message from Lance. This action is detected by the PDA which then generates a command to display the email message that has been selected by the user. Consider now FIG. 5. There, the FIG. 4 PDA is shown with the same email window 402 displayed for the user. In this instance, however, the user has provided a combination of user-input activities. Specifically, the user has touched an email message (i.e. the one from Lance) and, at the same time, has depressed the leftmost of buttons 404 (as indicated by the shading of the leftmost button). In this particular example, this specific combination of user-input activities is mapped to a "delete" command. Accordingly, the PDA detects the combination of user-input activities (as in step 302), generates an input command associated with the detected combination (as in step 304), and performs the generated input command (as in step 306).

Another embodiment provides for common areas of the same display window that is displayed on a PDA's touch screen to be mapped to different input commands. The PDA determines which input commands to select based on which area has been selected or touched by the stylus, as well as which (if any) button or buttons have been depressed by the user. Execution of multiple input commands can take place, for a given touch screen area, in a scroll-independent manner. Specifically, a user can access multiple input commands for a given touch screen area without having to physically scroll down through various additional menus.

As an example, consider again FIGS. 4 and 5. The common area of the display window, in this example, is the area in which the email from Lance appears. In the FIG. 4 case, the input command that is selected by the PDA is a "read" command which permits the user to read the email message. The "read" command is associated with the single user-input activity of engaging the touch screen area with the stylus. In the FIG. 5 case, however, the very same touch screen area for the display window is mapped to a different input command based upon the fact that the user has both selected or touched the area with the stylus and depressed the leftmost button.

In the above example, the PDA is configured for mapping multiple user-input activities to different commands using buttons that are currently in place and which have other functionalities. Specifically, buttons 404 in FIGS. 4 and 5 can have what can be considered typical functionalities that are normally associated with PDAs (i.e. selection, scrolling, and the like). When used in conjunction with the stylus, however, these buttons can take on a different character. Specifically, these buttons can now be imparted with extended functionalities which, together with the stylus, provide a user with an opportunity to be exposed to a much more robust collection of input commands for a given PDA screen display.

First Exemplary Embodiment

Figure 6:
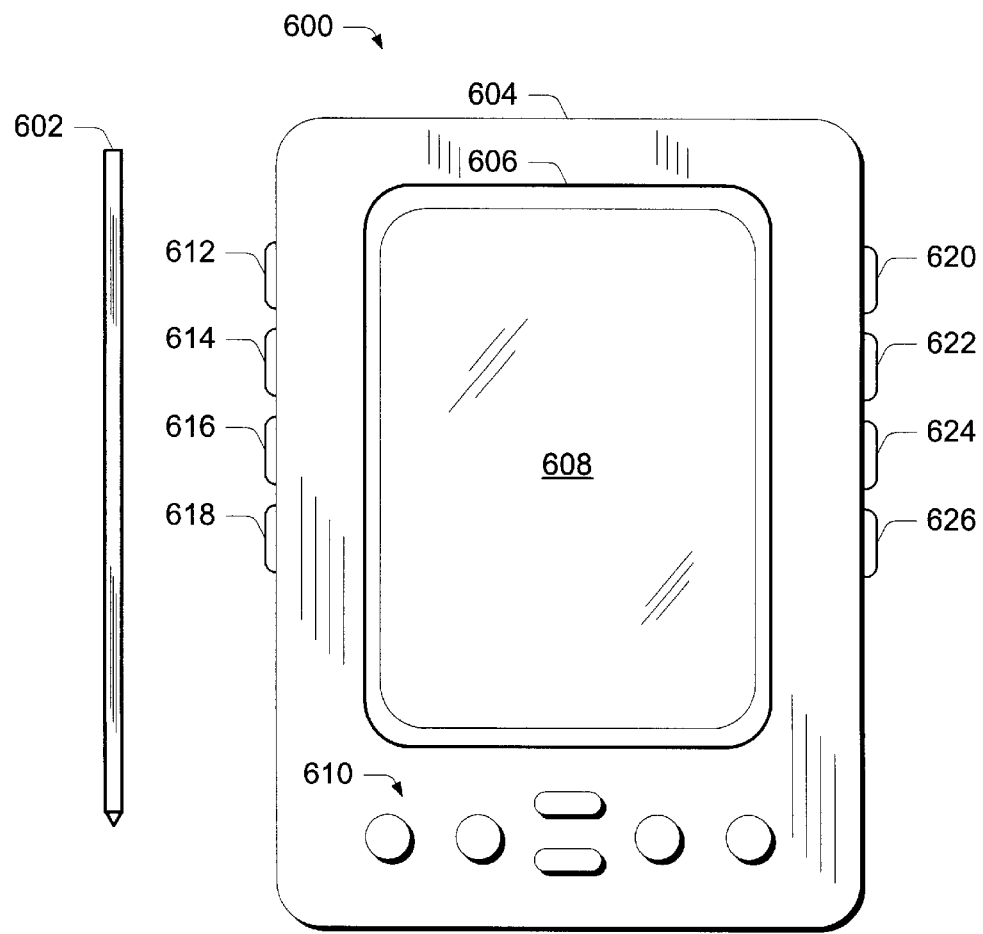
FIG. 6 is an illustration of a personal digital assistant in accordance with one embodiment.

FIG. 6 shows a PDA 600 in accordance with one embodiment. Reference numerals from the FIG. 1 PDA have been used except that they have been changed to the "600" series. For the sake of brevity, duplicative aspects of the FIG. 6 PDA are not described.

In this embodiment, PDA 600 is configured with specially-dedicated user-engagable structures that can be used in connection with the stylus 602, to provide the enhanced functionalities described above. Specifically, in this example, the user-engagable structures comprise buttons that can be depressed by the user. Exemplary buttons are shown at 612, 614, 616, 618 (on the left side of the PDA), and 620, 622, 624, and 626 (on the right side of the PDA). Buttons need not be provided on each side of the PDA. Specifically, a right-handed configuration can provide buttons only on the left side of the PDA (i.e. buttons 612–618), while a left-handed configuration can provide buttons only on the right side of the PDA (i.e. buttons 620–626).

Hence, in this example, buttons 612–626 can be incorporated into a table, such as table 200 (FIG. 2) so that mappings can be defined for the various combinations of user-input activities that can exist.

Second Exemplary Embodiment

In the embodiment discussed above, the user-engagable structures (e.g. the buttons) that enable a user to provide the different combinations of user-input activities are positioned on the housing of the PDA. In one instance, the buttons are the typical buttons that normally appear on the PDA except that they now have multi-function capabilities. In another instance, the buttons are special purpose buttons that are specifically provided for imparting the described characteristics to the PDA.

In the embodiments described below, the user engagable structures that enable a user to provide the different combinations of user-input activities are positioned on the stylus itself. This permits and promotes one-handed operation so that a user, by using only the hand that grips the stylus, can navigate through the different combinations of user-input activities.

Figure 7:
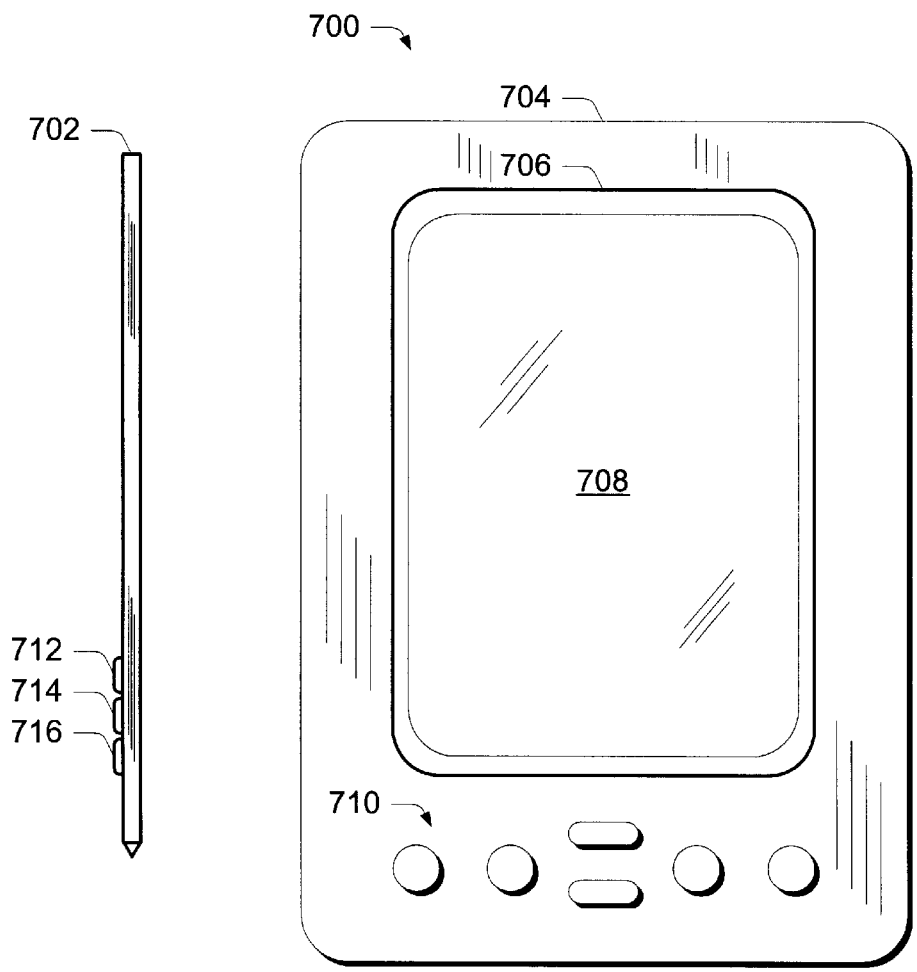
FIG. 7 is an illustration of a personal digital assistant in accordance with one embodiment.

Consider, for example, FIG. 7 which shows a PDA 700 in accordance with one embodiment. Reference numerals from the FIG. 1 PDA have been used except that they have been changed to the "700" series. For the sake of brevity, duplicative aspects of the FIG. 7 PDA are not described.

Notice that stylus 702 comprises multiple user-engagable structures positioned near the tip. In this example, the user-engagable structures comprise buttons 712, 714, and 716. The buttons 712–716 function in much the same way as the buttons described above when used in connection with the stylus engaging the PDA's touch screen 708. This function was discussed in some detail in connection with FIG. 2 and, for the sake of brevity, is not repeated here.

Although the user-engagable structures on the stylus function in much the same way as described above, in this embodiment, the stylus is configured in a manner which enables it to articulate to the PDA 700 that the user has engaged one or more of the buttons on the stylus. This way, the PDA's processor can take the necessary actions to map the user-input activities to the proper input commands and execute those commands.

Figure 8:
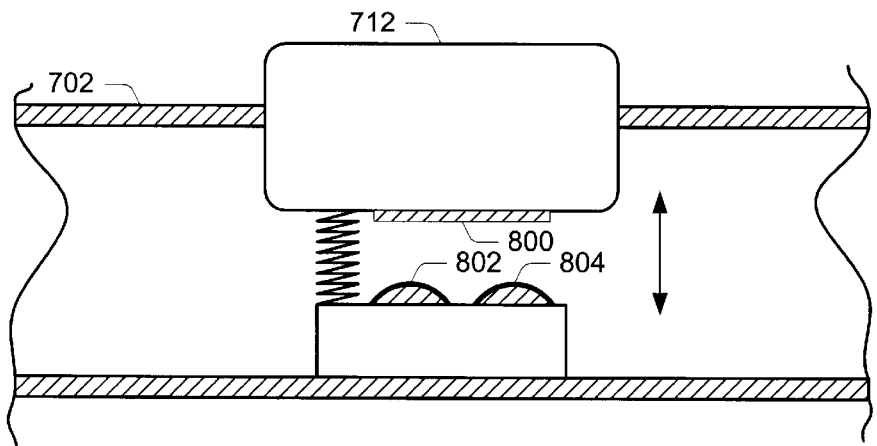
FIG. 8 is a cross-sectional view of a portion of a stylus in accordance with one embodiment.

Consider, for example, FIG. 8 which shows but one way that the articulation process can take place. There, a cross-sectional view of a portion of stylus 702 is shown. Button 712 is spring biased by a spring (not specifically designated) that permits the button to be reciprocated in the vertical direction as viewed in the FIGURE. An electrical contact 800 is disposed on the underside of the button. A pair of electrical contacts 802, 804 are supported on the inside of the stylus housing. When button 712 is pressed by a user, the button moves downward sufficient to bring contact 800 into engagement with contacts 802, 804, thus completing a circuit. When the circuit is complete, a signal can be transmitted to the PDA to inform the PDA that a particular button has been depressed. Each button can correspond to a different signal so that the PDA knows which button on the stylus has been depressed.

Figure 9:
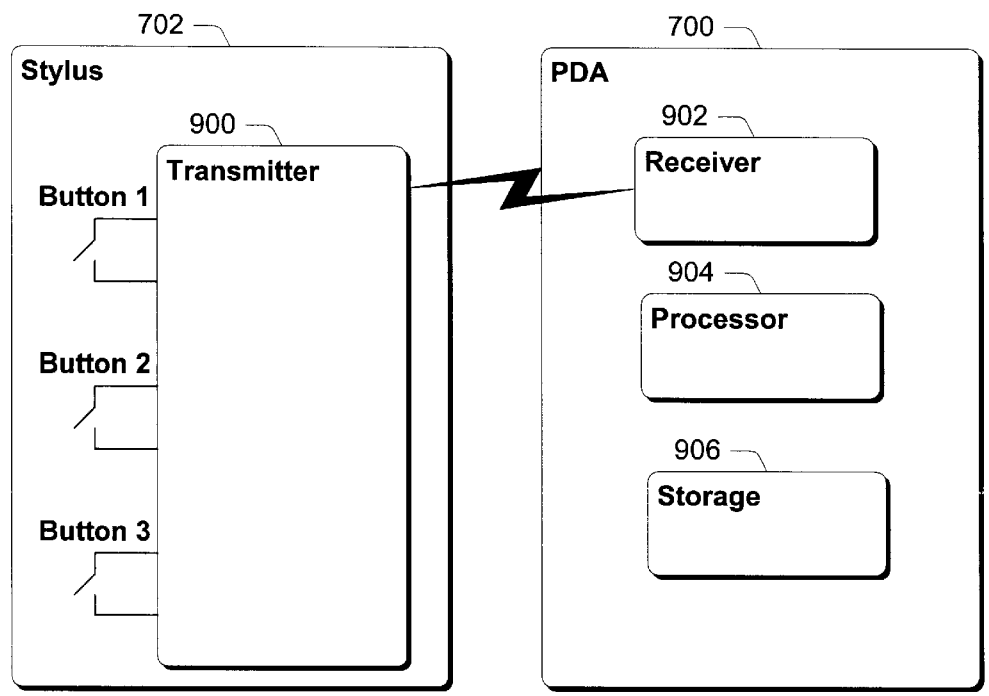
FIG. 9 is a block diagram that illustrates various components of a stylus and a PDA in accordance with one embodiment.

As an example, consider FIG. 9 which shows stylus 702 and PDA 700. Stylus 702 comprises a transmitter 900 which can be any suitable transmitter that is capable of transmitting a signal that can be received by PDA 700. Examples of suitable transmitters can include, without limitation, bluetooth transmitters, radio frequency (RF) transmitters, light transmitters, infrared (IR) transmitters and the like. As shown, each button on the stylus is represented as a switch. When the switch is closed (corresponding to a user depressing an associated button), a circuit is formed which permits the transmitter 900 to produce a signal which is then transmitted to the PDA 700. As noted above, each button can be associated with a different signal so that the PDA knows which button has been depressed.

PDA 700 comprises, in this example, a receiver 902 which can be any suitable receiver that is capable of receiving a signal generated and transmitted by transmitter 900. Examples of suitable receivers can include, without limitation, bluetooth receivers, radio frequency (RF) receivers, light receivers, infrared (IR) receivers and the like. PDA 700 also includes a processor 904 and storage 906. Storage 906 contains software instructions that are executed on processor 904 for generating and performing input commands that correspond to the user-input activities that are provided by the user.

Figure 10:
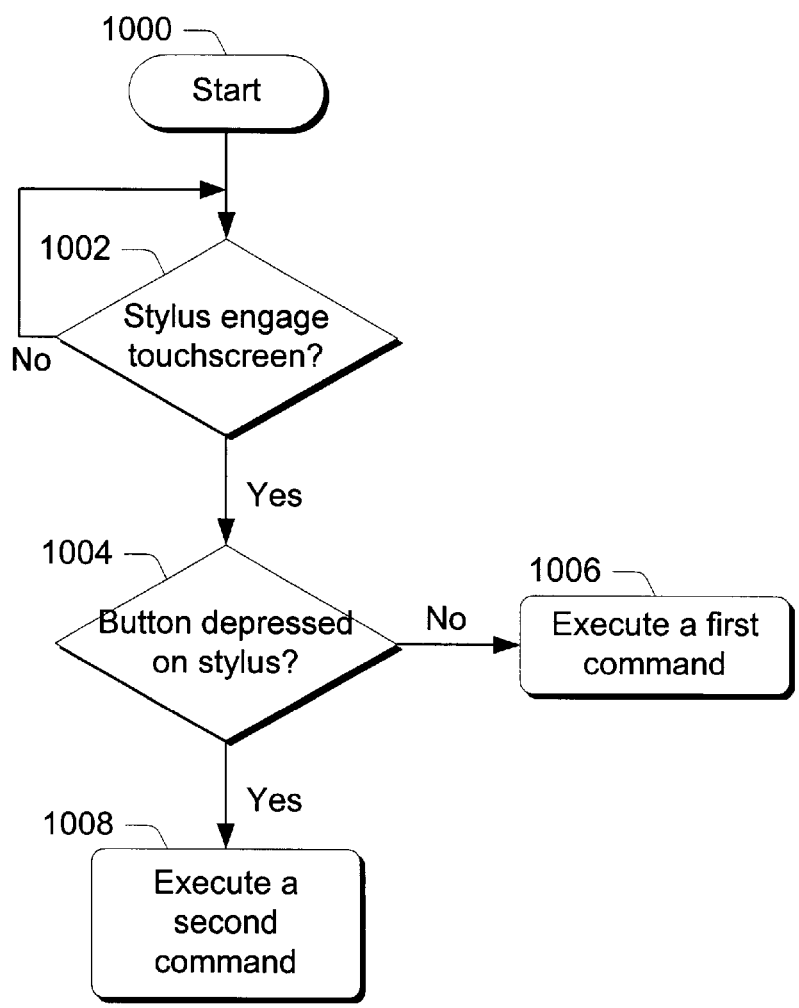
FIG. 10 is a flow diagram that describes steps in a method in accordance with one embodiment.

FIG. 10 is a flow diagram that describes steps in a method in accordance with one embodiment. The method can be implemented in any suitable hardware, software, firmware, or combination thereof. In the illustrated example, the method is implemented by a suitably programmed PDA such as PDA 700 in FIG. 9.

Step 1000 starts the method and step 1002 determines whether a stylus has engaged the touch screen. This step can be performed using techniques that are well known in the PDA art. If the stylus has not engaged the touch screen, the method loops back to step 1002 and waits until the stylus has engaged the touch screen. If the stylus has engaged the touch screen, step 1004 determines whether one or more buttons on the stylus have been depressed by the user. This step can be implemented in any suitable way. Examples of how this can be done are described in connection with FIGS. 8 and 9 above. If a button has not been depressed by the user, step 1006 executes a first command. This step is implemented by the PDA's processor. If, on the other hand, a button is depressed on the stylus, step 1008 executes a second command which is different from the first command.

It is to be appreciated and understood that steps 1002 and 1004 need not be performed in the illustrated order. Specifically, the method could first detect that a button on the stylus has been depressed, and then wait for the stylus to engage the touch screen in order to execute the second command.

It is to be appreciated and understood that the above-described stylus can transmit a signal to the PDA using any suitable transmission medium. For example, the stylus can include a wire that is connected between it and the PDA. Accordingly, the signal can then be transmitted via the wire. In addition, the signal can be transmitted to the PDA in the way that the stylus physically engages the touch screen. Specifically, the stylus can be specially configured to engage the touch screen in a first way when a button is not depressed. This first way can involve fitting the stylus with a first type of tip. When a button is depressed, the tip configuration of the stylus can be changed to a second type of tip that physically engages the touch screen in a different, yet perceptible manner.

CONCLUSION

The embodiments described above can greatly enhance the input fidelity of personal digital assistants (PDAs) and other handheld, stylus-engagable computing devices. In some embodiments, this can be done by associating input commands with different user-input activities, including different combinations of user-input activities. By using different combinations of user-input activities to designate particular input commands, a more robust collection of commands can be provided to a user in a manner that is simple, straight-forward and easy to understand.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A method of operating a stylus-engagable, hand-held computing device, the method comprising:
    associating one or more non-text writing input commands for use with a stylus-engagable, hand-held computing device, with a combination of user-input activities, the computing device comprising a touch screen that is engagable with a stylus;
    transmitting a signal from the stylus to the hand-held computing device, said transmitting comprising a first type of user-input activity;
    detecting, in combination with said first type of user-input activity, at least one other type of user-input activity;
    generating a non-text writing input command that is associated with the detected combination of user-input activities; and
    performing the generated command.

2. The method of claim 1, wherein said transmitting is performed responsive to a user engaging a button on the stylus.

3. The method of claim 1, wherein said transmitting is performed responsive to a user engaging multiple buttons on the stylus.

4. The method of claim 1, wherein said at least one other type of user-input activity comprises touching the computing device's touch screen with the stylus.

5. One or more computer-readable media having computer-readable instructions thereon which, when executed by one or more processors on a stylus-engagable, hand-held computing device having a touch screen, cause the one or more processors to:
    detect a combination of user-input activities, the combination being associated with a non-text writing input command, the user-input activities comprising (1) engaging a button on the stylus, and (2) touching the computing device's touch screen with the stylus;
    generate the input command that is associated with the detected combination of user-input activities; and
    perform the generated command.

6. A personal digital assistant comprising the computer-readable media of claim 5.

7. A personal digital assistant comprising:
    a stylus having one or more user-depressible buttons;
    a stylus-engagable touch screen;
    one or more processors;
    one or more computer-readable media;
    an association embodied on the readable media, the association defining relationships between one or more non-text writing input commands and a combination of user-input activities associated with individual non-text writing input commands; and
    computer-readable instructions on the readable media which, when executed by the one or more processors, cause the one or more processors to:
    detect a combination of user-input activities, one user-input activity comprising touching the touch screen with the stylus;
    generate a non-text writing input command that is associated with the detected combination of user-input activities; and
    perform the generated command.

8. The personal digital assistant of claim 7, wherein the instructions cause the one or more processors to detect a user-input activity that comprises depressing a button on the stylus.

9. A method of operating a stylus-engagable personal digital assistant, the method comprising:

displaying a selectable area on a touch screen of a personal digital assistant, said area being touch-selectable by a stylus associated with the personal digital assistant;

executing a first non-text writing command if a stylus engages the selectable area; and executing a second different non-text writing command if the stylus engages the selectable area and the stylus transmits a receivable signal to the personal digital assistant.

10. The method of claim 9, wherein said executing of the second different command comprises doing so responsive, in part, to a user engaging one or more buttons on the stylus to cause the stylus to transmit the receivable signal.

11. The method of claim 9, wherein said executing of the second different command comprises doing so responsive, in part, to the stylus transmitting a signal via a bluetooth transmitter.

12. The method of claim 9, wherein said executing of the second different command comprises doing so responsive, in part, to the stylus transmitting a signal via a radio frequency (RF) transmitter.

13. The method of claim 9, wherein said executing of the second different command comprises doing so responsive, in part, to the stylus transmitting a signal via a light transmitter.

14. The method of claim 9, wherein said executing of the second different command comprises doing so responsive, in part, to the stylus transmitting a signal via a infrared (IR) transmitter.

15. One or more computer-readable media having computer-readable instructions thereon which, when executed by one or more processors on a stylus-engagable, hand-held personal digital assistant having a touch screen, cause the one or more processors to:

display a selectable area on the touch screen, said area being touch-selectable by a stylus associated with the personal digital assistant;

execute a first non-text writing, command if only a stylus engages the selectable area; and execute a second different non-text writing command if the stylus engages the selectable area and the stylus transmits a receivable signal to the personal digital assistant.

16. A hand-held computing device comprising:

a stylus comprising one or more user-depressible buttons and a transmitter coupled with the one or more buttons, the transmitter being configured to transmit a signal when a button is depressed;

a stylus-engagable touch screen;

one or more processors;

one or more computer-readable media;

an association embodied on the readable media, the association defining relationships between one or more non-text writing input commands and a combination of user-input activities associated with individual non-text writing input commands; and computer-readable instructions on the readable media which, when executed by the one or more processors, cause the one or more processors to:

display a selectable area on the touch screen, said selectable area being touch-selectable by the stylus;

execute a first non-text writing command if the stylus engages the selectable area; and execute a second different non-text writing command if the stylus engages the selectable area and the stylus transmits a receivable signal responsive to a user depressing at least one of the user-depressible buttons.

17. The hand-held computing device of claim 16 embodied as a personal digital assistant.

18. The hand-held computing device of claim 16, wherein the computer-readable instructions cause the one or more processors to execute a second different command responsive, in part, to the stylus transmitting a bluetooth signal.

19. The hand-held computing device of claim 16, wherein the computer-readable instructions cause the one or more processors to execute a second different command responsive, in part, to the stylus transmitting a radio frequency (RF) signal.

20. The hand-held computing device of claim 16, wherein the computer-readable instructions cause the one or more processors to execute a second different command responsive, in part, to the stylus transmitting a light signal.

21. The hand-held computing device of claim 16, wherein the computer-readable instructions cause the one or more processors to execute a second different command responsive, in part, to the stylus transmitting a infrared (IR) signal.

\* \* \* \* \*